United States Patent [19]

Siriwardane

[11] Patent Number: 5,703,003
[45] Date of Patent: *Dec. 30, 1997

[54] DURABLE REGENERABLE SORBENT PELLETS FOR REMOVAL OF HYDROGEN SULFIDE FROM COAL GAS

[75] Inventor: Ranjani V. Siriwardane, Morgantown, W. Va.

[73] Assignee: United States Department of Energy, Washington, D.C.

[*] Notice: The term of this patent shall not extend beyond the expiration date of Pat. No. 5,494,880.

[21] Appl. No.: 562,538

[22] Filed: Nov. 1, 1995

Related U.S. Application Data

[63] Continuation-in-part of Ser. No. 216,392, Mar. 23, 1994, Pat. No. 5,494,880.

[51] Int. Cl.$^6$ .............................. B01J 20/02; B01J 20/30
[52] U.S. Cl. .............. 502/400; 502/405; 502/407; 502/411; 502/415; 502/428; 502/517
[58] Field of Search .................. 502/400, 405, 502/407, 411, 428, 429, 517, 415; 423/230

[56] References Cited

U.S. PATENT DOCUMENTS

| | | | |
|---|---|---|---|
| 3,518,206 | 6/1970 | Sowards et al. | 252/446 |
| 4,059,418 | 11/1977 | Cull | 55/73 |
| 4,076,651 | 2/1978 | Jacques | 252/451 |
| 4,088,736 | 5/1978 | Courty et al. | 423/230 |
| 4,180,549 | 12/1979 | Olsson et al. | 423/230 |
| 4,732,888 | 3/1988 | Jha et al. | 502/406 |
| 5,045,522 | 9/1991 | Kidd | 502/405 |
| 5,130,288 | 7/1992 | Delzer et al. | 502/405 |
| 5,177,050 | 1/1993 | Schubert | 502/415 |
| 5,254,516 | 10/1993 | Gupta et al. | 502/84 |
| 5,439,867 | 8/1995 | Khare et al. | 502/407 |
| 5,486,631 | 1/1996 | Mitchnick et al. | 556/10 |
| 5,494,880 | 2/1996 | Siriwardane | 502/400 |
| 5,538,703 | 7/1996 | Flytzani-Stephanopoulos | 423/230 |

FOREIGN PATENT DOCUMENTS

| | | | |
|---|---|---|---|
| 0159730 | 10/1985 | European Pat. Off. | 423/230 |
| 2127002 | 4/1984 | United Kingdom | |

*Primary Examiner*—Gary P. Straub
*Assistant Examiner*—Timothy C. Vanoy
*Attorney, Agent, or Firm*—Lisa A. Jarr; Stephen D. Hamel; William R. Moser

[57] ABSTRACT

Pellets for removing hydrogen sulfide from a coal gasification stream at an elevated temperature are prepared in durable form usable over repeated cycles of absorption and regeneration. The pellets include a material reactive with hydrogen sulfide, in particular zinc oxide, a binder, and an inert material, in particular calcium sulfate (drierite), having a particle size substantially larger than other components of the pellets. A second inert material and a promoter may also be included. Preparation of the pellets may be carried out by dry, solid-state mixing of components, moistening the mixture, and agglomerating it into pellets, followed by drying and calcining. Pellet size is selected, depending on the type of reaction bed for which the pellets are intended. The use of inert material with a large particle size provides a stable pellet structure with increased porosity, enabling effective gas contact and prolonged mechanical durability.

11 Claims, No Drawings

DURABLE REGENERABLE SORBENT PELLETS FOR REMOVAL OF HYDROGEN SULFIDE FROM COAL GAS

CROSS REFERENCE OF RELATED APPLICATION

This application is a continuation-in-part of application Ser. No. 08/216,392, filed on Mar. 23, 1994, now U.S. Pat. No. 5,494,880.

The United States Government has rights in this invention pursuant to the employer-employee relationship of the United States Department of Energy and the inventor.

FIELD OF THE INVENTION

This invention relates to desulfurization of coal gas.

BACKGROUND OF THE INVENTION

One of the most promising advanced systems for producing electrical energy from coal is the integrated gasification combined cycle since it can provide economically and environmentally sound systems which operate with improved thermal efficiency. When coal is gasified, however, sulfur that is present in most coals is converted to sulfur-bearing pollutant gases, in particular, hydrogen sulfide. In addition to environmental problems caused by these gases, protection of turbines and related equipment from corrosive action of sulfur-bearing gases also necessitates their removal.

Development of a sorbent in a form suitable for removal of hydrogen sulfide has been a challenging problem owing to requirements imposed for a successful operating system. The sorbent should be operational at high temperatures of 370° to 760° C. (700° to 1,400° F.) in the presence of reducing gases such as hydrogen and carbon monoxide. For obtaining effective contact with a gas stream, the sorbent should be incorporated in pellets suitable for use in a fixed, moving bed, or fluidized bed reactor. For successful operation of such a system, the pellets would of necessity be required to undergo repeated, alternating cycles of sulfidation and regeneration. In each cycle, a reactive oxide in the pellet is converted to a solid metal sulfide upon undergoing absorption of and reaction with hydrogen sulfide. After obtaining complete sulfidation, the spent pellet bed is then regenerated by being contacted with an oxidizing gas stream at a high temperature.

Various sorbents, mostly metal oxides, have been tested in the past for removal of hydrogen sulfide from a coal gasification stream. While these sorbents have shown a high initial reactivity, they have demonstrated deficiencies in their performance in pellet beds. Upon undergoing repeated cycles of sulfidation and regeneration, sorbent pellets have experienced either rapid and continuous decrease in reactivity or physical deterioration due to spalling during multi-cycle testing, making them undesirable. These deficiencies are believed to result from a decrease in surface area of a high-surface-area material in which the reactive oxide is incorporated, this decrease occurring as a consequence of prolonged exposure to high temperatures. Internal porosity is also decreased, the reactive oxide as a result becoming less available for further reaction. Paths in the pellets for passage of reactant gas tend to become closed off and ineffective. The pellets also may have insufficient porosity to provide internal space for the presence of metal sulfide or sulfate reaction products, resulting in cracking and spalling. Durable sorbent pellets that show a prolonged period of high reactivity with hydrogen sulfide along with resistance to spalling during repeated operating cycles of sulfidation and regeneration are therefore needed.

SUMMARY OF THE INVENTION

The present invention is directed to durable sorbent pellets for removing hydrogen sulfide from a gas stream by absorption at an elevated temperature. Such pellets are comprised of a finely divided, reactive metal oxide or other material reactive with hydrogen sulfide at a selected temperature, a binder, and a first inert material, for example, silica gel or calcium sulfate (drierite), having, at least in part, a particle size substantially larger than the reactive oxide and other components. A second, finely divided inert diluent material and a promoter may optionally be included in the pellets.

Durability of the pellets, as evidenced by improved chemical and mechanical stability under repeated cycles of absorption and regeneration, is believed to result from the stabilizing effect of inert materials and more effective contact of the gas stream with the reactive oxide, enabled by the inert material with large particle size. Incorporation of this material results in formation of a porous pellet structure with a larger number of paths for passage of the gas stream and provides enough void space for expansion of the metal oxide upon conversion to sulfide and sulfate during reaction with the sulfide gas and air. Effective and preferred amounts of required and optional components of the pellets are given, along with specific particle sizes as needed to provide porosity for pellet durability. The pellets may be prepared to have a pellet size suitable for the type of reactor in which they are to be used.

DETAILED DESCRIPTION OF THE INVENTION

The material reactive with hydrogen sulfide may comprise a metal oxide, metal salt, or a mixture thereof reactive with hydrogen sulfide at a selected temperature. Zinc oxide is preferred for use over its effective temperature range of about 315° to 645° C. (600° to 1,200° F.). For operation at higher temperatures manganese oxide or copper oxide, which can tolerate higher temperatures, may be used. At lower temperature, iron oxide or chromium oxide may be employed. Mixtures of reactive metal oxide may also be used. Reactive metal salts including acetates, formates, carbonates, and nitrates may be used instead of metal oxides.

The first inert material containing larger particles for use in the pellets may be selected from the group consisting of silica gel, silica, alumina, alumina gel, titania gel, calcium sulfate (drierite), zinc silicate, zinc aluminate, and sand, with drierite being preferred. This component may incorporate material with varying particle sizes, but at least 30 weight percent of the particles should be made up of large particles having at least 2 times the size of the other components of the pellets. The remainder of this inert material may comprise smaller particles. Other components are preferably used at the smallest available particle size, generally below 50 microns.

The first inert material may be provided in the pellets at a total concentration of 2 to 40 weight percent and more preferably at 5 to 15 weight percent. Other components of the pellets become loosely packed around the large particles of this material, creating better porosity in the pellets. Upon being subjected to exposure at higher temperatures in preparation or operation, the inert material with large particle size undergoes a decrease in surface area, but porosity of the pellets is increased due to creation of additional voids around the large particles.

A binder is required in the pellets to hold them together. The binder may comprise bentonite, kaolinite, other alumino silicates, calcium sulfate, cement, or mixtures of these materials. A mixture of bentonite and calcium sulfate is preferred. Concentration of the binder in the pellets may range from 2 to 60 weight percent.

A second inert material may be included in the pellets to serve as a diluent and provide additional stability since this material does not enter into the reaction with hydrogen sulfide or otherwise change during the reaction period. The second inert material may be selected from a group consisting of titanium oxide, calcium sulfate, calcium phosphate, calcium silicate, magnesium sulfate, zinc silicate, zinc aluminate, and alumino silicates. This component may be used at a concentration of 0 to 40 weight percent of the pellets and preferably 10 to 30 percent. In preparing pellets containing the second inert material, temperatures high enough to cause a reaction between this material and the reactive oxide are to be avoided to prevent loss of reactivity. Calcium sulfate is a preferred material for this component.

A promoter may optionally be included in the pellets to enhance the efficiency of the reaction with hydrogen sulfide and also to reduce any tendency for interaction between the first inert material and the reactive material. The promoter may be selected from a group consisting of oxides or salts of copper, iron, cobalt, manganese, and nickel, and mixtures thereof. Concentration of the promoter may vary from 0 to 8 weight percent of the pellets and preferably 1 to 5 percent.

It is noted that calcium sulfate is included within the listing of materials for first and second inert materials as well as for the binder. Calcium sulfate in the form of drierite, which is normally used as a dessicant, is preferred for the first inert material with large particle size. Other forms of this compound (eg gypsum) may be used when included in the pellets for other purposes.

As indicated above, large particles of inert material are required to obtain necessary porosity in the pellets. The other components are preferred to have a minimum particle size for maximum reactivity, strength, and optimum formation of voids around the larger particles. Particle sizes of the first inert material with large particle size may be varied, depending on the desired pellet sizes for different types of reactor systems. For fixed/moving bed reactors, spherical or cylindrical pellets over 1 mm in size, and typically 2 to 5 mm, are used. For pellets of this size, particle sizes of the first inert component with large particle size may be over 50 microns and preferably 75 to 700 microns (25 to 200 mesh). Fluidized bed/transport reactors employ pellets under 500 microns, and the first inert component with large particle size for this pellet size could be sized under 150 microns, preferably 5 to 100 microns.

Pellets made up of the above components may be prepared by solid-state mixing and adding a sufficient amount of water to cause the pellets to agglomerate or adhere together. Mixer-pelletizer or compressing equipment and other methods of agglomeration known in the prior art may be used for this purpose. The agglomerated pellets are dried and calcined at an elevated temperature to convert them to durable form. Drying the pellets in a vacuum oven at a temperature over 100° C. (212° F.) and preferably about 150° C. (302° F.) for 10 to 16 hours, followed by calcination at a temperature above 371° C. (700° F.), and preferably at about 550° C. (1,022° F.) for 5 to 15 hours may be employed.

The invention is illustrated by the following example.

EXAMPLE

Four sorbent compositions were prepared and tested by being subjected to repeated cycles of sulfidation and regeneration under low-pressure and high-pressure conditions by means of the following procedures.

The sorbents 1–4 were prepared using solid state mixing of the components, followed by agglomeration with water, drying the resulting pellets in vacuum at 150° C., and calcining at 550° C. for 10 hours. The sorbents consisted of zinc oxide, silica gel, or drierite, calcium sulfate, and bentonite. The compositions of the sorbents were as follows:

| Sorbent 1 | |
|---|---|
| Zinc oxide (−325 mesh, <45 microns) powder | 1,000 grams |
| Silica gel indicating desiccant (surface area 700 m²/g) with 0.3 to 0.4 wt % cobalt chloride as the indicator | |
| 40 to 50 mesh | 64 grams |
| −100 mesh | 64 grams |
| Bentonite | 145 grams |
| Calcium sulfate | 491 grams |

| Sorbent 2 | |
|---|---|
| Zinc oxide (−325 mesh, <45 microns) powder | 1,000 grams |
| Silica gel desiccant (surface area 700 m²/g and non-indicating) | |
| 35 to 60 mesh | 64 grams |
| −100 mesh | 63 grams |
| Bentonite | 145 grams |
| Calcium sulfate | 491 grams |
| Copper nitrate | 50 grams |

| Sorbent 3 | |
|---|---|
| Zinc oxide (−325 mesh, <45 microns) powder | 1,025 grams |
| Silica gel desiccant (surface area 700 m²/g and non-indicating) | |
| 100 to 200 mesh | 350 grams |
| Bentonite | 150 grams |
| Calcium sulfate | 300 grams |
| Copper nitrate | 50 grams |

| Sorbent 4 | |
|---|---|
| Zinc oxide (−325 mesh, <45 microns) powder | 1,000 grams |
| Drierite | |
| 20 to 40 mesh | 64 grams |
| −100 mesh | 63 grams |
| Bentonite | 145 grams |
| Calcium sulfate | 491 grams |
| Copper nitrate | 50 grams |

The BET nitrogen surface area of these sorbents were in the range of 20 to 90 m²/g.

TESTING OF SORBENTS 2–4 FOR HYDROGEN SULFIDE REMOVAL IN THE LOW-PRESSURE REACTOR

Sorbent pellets in the size ranges of both 2 to 4 mm (−5+8 mesh) and 4 to 5 mm (4+5 mesh) were utilized for reactor testing.

Sulfidation and regeneration cycle tests were performed in a fixed bed reactor 5 cm (2.2") diameter by 13.8 cm (6") length at 537° C. The composition of the gases was 0.2 (volume percent) $H_2S$, 21% CO, 15% $H_2$, 9% $H_2O$, 47% $N_2$, and 7% $CO_2$. The gas velocity was 0.69 cm/s (0.3 ft/s), and the space velocity was 2,000 $h^{-1}$. The reactor inlet pressure was 260 Kpa (37.7 psia). Breakthrough curves (plots of hydrogen sulfide concentration at the reactor outlet versus time) were obtained for hydrogen sulfide, and the breakthrough time was defined as the time corresponding to 200 ppmv $H_2S$ in the outlet gas.

All regenerations in the low-pressure reactor were done at 272 kPa (39.7 psia), and the gas velocity was maintained constant during each stage at 0.04 to 0.05 m/s (0.13 to 0.15 ft/s). Regenerations using air diluted with steam were conducted in three stages. The temperatures of the stages were 538° C., 593° C., and 649° C. (1,000° F., 1,100° F., and 1,200° F.). The steam concentration in all three stages was 50%, with a varying concentration of oxygen and nitrogen. The oxygen concentrations during the three stages were 1.0%, 2.5%, and 3.5%, respectively.

The results of the sulfidation/regeneration tests for sorbent 2, 3, and 4, with 2,000 ppm $H_2S$, are shown in Table 1. The breakthrough time (defined as the time corresponding to 200 ppmv $H_2S$) increased at the second sulfidation cycle, but decreased at the third sulfidation cycle and reached stabilization. In all the sorbents, the initial hydrogen sulfide concentration was 0 up to about 13 hours of operation. This indicates that this sorbent has an excellent sulfidation equilibrium. Visual analysis of the sorbent after completion of sulfidation cycles indicated that there was no spalling, cracking, or any other changes in the physical characteristics. This indicated that in addition to the high capacity, the durability of the sorbent was excellent. The crush strength of the sulfided sorbents was more than that of the fresh sorbent.

TABLE 1

Breakthrough times for the sorbents in the low-pressure reactor

| Sulfidation Cycle | Breakthrough Time (Hours) | | |
|---|---|---|---|
| | Sorbent 2 | Sorbent 3 | Sorbent 4 |
| 1 | 24 | 15 | 17 |
| 2 | 32 | 21 | 48 |
| 3 | 25 | 16 | 38 |
| 4 | 25 | 17 | 38 |

TESTING OF SORBENT 3 FOR HYDROGEN SULFIDE REMOVAL IN THE HIGH-PRESSURE REACTOR

Sorbent 3

Sorbent 3 was also tested in a high-pressure reactor (16" height by 2" diameter). The reactor pressure was 1,034 kPa (150 psia), the temperature of the bed was 537° C. (1,000° F.), and the superficial velocity of the gas was 30 cm/sec (1 ft/sec). The gas composition utilized in sulfidation was 800 ppm $H_2S$, 47.92% nitrogen, 9% steam, 7% carbon dioxide, 21% carbon monoxide, and 15% hydrogen. The regeneration with air diluted with steam was also performed in three stages. The gas compositions in the three stages were 0.5 to 7.0% oxygen, 50% steam, and 49.5 to 43% nitrogen. The temperatures of the three stages were 537° C., 579° C., and 732° C. (1,000° F., 1,075° F., and 1,350° F.).

The results of the 20-cycle sulfidation/regeneration high-pressure tests of the current sorbent are shown in Table 2. The sulfur capacity of the sorbent improved during the second cycle and decreased again at the third cycle. The reactivity was fairly stable during the third to twentieth cycles. The sorbent was examined after the testing, and spalling, cracking, or any other physical deterioration characteristics were not observed. The condensates collected during the testing were very clear, which indicates there was no powder loss from the sorbent during the testing. This also indicates that this sorbent has both high capacity and high durability and also performs well in the high-pressure environment.

TABLE 2

Breakthrough times for sorbent 3 in the high-pressure reactor

| Cycle Number (Hours) | Breakthrough Time (Weight %) | Total Sulfur |
|---|---|---|
| 1 | 5.25 | 8.3 |
| 2 | 11.25 | 16.1 |
| 3 | 7.50 | 11.6 |
| 4 | 7.00 | 11.3 |
| 5 | 7.50 | 11.9 |
| 6 | 7.00 | 10.5 |
| 7 | 7.00 | 8.9 |
| 8 | 6.75 | 11.5 |
| 9 | 7.00 | 9.7 |
| 10 | 6.75 | 10.6 |
| 11 | 6.00 | — |
| 12 | 6.5 | 9.0 |
| 13 | 6.25 | 10.6 |
| 14 | 6.25 | 9.8 |
| 15 | 7.25 | 9.6 |
| 16 | 5.25 | 6.8 |
| 17 | 6.00 | 11.1 |
| 18 | 5.00 | 7.5 |
| 19 | 6.00 | 8.4 |
| 20 | 6.00 | 8.4 |

Testing of Sorbents 2 and 4 in High-Pressure Reactor

Sorbents 2 and 4 were also tested in a high-pressure reactor (6" height and 2" diameter). The reactor pressure was 2,026.5 KPa (293.2 psia), and the temperature of the bed was 482° C. (900° F.). The gas composition utilized during the sulfidation was 20,000 ppm $H_2S$, 18% nitrogen, 20% steam, 10% carbon dioxide, 30% carbon monoxide, and 20% hydrogen. Regeneration was performed with 2% oxygen and nitrogen at 565° to 705° C. (1,050° to 1,300° F.). After the regeneration with air, 100% nitrogen was introduced at 1,350° F. The pressure during the regeneration was 793 KPa (102.8 psia). The space velocity during testing of sorbent 2 was 5,000 $hr^{-1}$, while the space velocity during the testing of sorbent 4 was 2,000 $hr^{-1}$.

Results of the 50-cycle tests of sorbent 2 are listed in Table 3.

TABLE 3

Breakthrough times and sulfur loading values for sorbent 2

| Sulfidation Cycle | Breakthrough Time (Hours) | Total Sulfur (Weight %) |
|---|---|---|
| 1 | 1.25 | 16 |
| 10 | 0.55 | 11 |
| 20 | 0.43 | 9 |
| 35 | 0.35 | 9 |
| 50 | 0.33 | 8 |

*Sample removed for analysis

The sulfur capacity of the sorbent decreased during the first ten cycles. This decrease is due to the regeneration (high-pressure) problems encountered during the first five cycles because of both the high sulfur loading and the poor temperature control at 5,000 hr$^{-1}$ space velocity. However, the sulfur capacity was fairly constant after the tenth cycle up to the fiftieth cycle. Spalling, cracking, or any other deterioration of the sorbent was not observed after 50-cycle testing.

Sorbent 4 was tested under similar conditions except at a gas space velocity of 2,000 hr$^{-1}$ for 10 cycles. The sulfur loading after the tenth sulfidation cycle was 17 weight percent. There was no spalling, cracking, or any other physical deterioration of the sorbent.

The above example is merely illustrative and is not to be construed as limiting the scope of the invention, which is limited only as indicated by the appended claims.

I claim:

1. Durable sorbent pellets chemically and physically stable for use in multi-cycle sulfidation and regeneration processes at temperatures over 260° C. (500° F.) consisting of a mixture of the following components:

a material reactive with hydrogen sulfide and selected from the group consisting of metal oxides, acetates, formates, carbonates ad nitrates of zinc, copper, iron, manganese, chromium, and mixtures thereof and having a particle size below 50 microns—30 to 65 weight percent;

a diluent selected from the group consisting of, calcium sulfate, calcium phosphate, magnesium sulfate, and zinc silicate, and having a particle size less than 50 microns—20 to 40 weight percent;

an inert material comprising particles having a particle size at least twice that of said material reactive with hydrogen sulfide selected from the group consisting of silica, silica gel, alumina, alumina gel, calcium sulfate (drierite), zinc silicate, and sand, wherein the particle size of said inert material is chosen to create additional voids between the components, thus increasing the porosity of the sorbent pellets —2 to 40 weight percent;

a binder unreactive with hydrogen sulfide, having a particle size less than said inert material, and selected from the group consisting of bentonite, kaolinite, and cement and mixtures thereof—2 to 45 weight percent;

a promoter selected from the group consisting of oxides and salts of copper, cobalt, manganese, nickel and mixtures thereof—an amount greater than zero and up to 10 weight percent;

said mixture having been moistened with water, formed into pellets, dried, and calcined at a temperature above 538° C. (1,000° F.), but low enough to avoid a chemical reaction of said material reactive with hydrogen sulfide with said diluent; and said material reactive with hydrogen sulfide being unreactive with all other components of said mixture at said calcination temperature.

2. Pellets as defined in claim 1 wherein said material reactive with hydrogen sulfide is zinc oxide.

3. Pellets as defined in claim 1 wherein said inert material is calcium sulfate (drierite).

4. Pellets as defined in claim 1 wherein said diluent is calcium sulfate.

5. Pellets as defined in claim 1 wherein said inert material comprises at least 20 percent of particles at least 2 times larger than the particle size of said material reactive with hydrogen sulfide.

6. Pellets as defined in claim 5 wherein said inert material comprises particles falling within a plurality of size fractions, one of which comprises particles at least twice the particle size of said material reactive with hydrogen sulfide.

7. Pellets as defined in claim 1 comprising pellets having a size in the range of 2 mm to 5 mm and wherein the starting particle size of said inert material comprises particles over 50 microns in diameter.

8. Pellets as defined in claim 7 wherein the particle size of said inert material is within the range of 75 to 700 microns.

9. Pellets as defined in claim 1 comprising pellets having a size below 500 microns and wherein the size of the said inert material comprises less than 150 microns in diameter.

10. Pellets as defined in claim 9 wherein the particle size of said inert material is from 5 to 100 microns.

11. Durable sorbent pellets chemically and physically stable for use in multi-cycle sulfidation and regeneration processes at temperatures over 260° C. (500° F.) consisting of a mixture of the following components:

a material reactive with hydrogen sulfide and selected from the group consisting of metal oxides, acetates, formates, carbonates and nitrates of zinc, copper, iron, manganese, chromium, and mixtures thereof and having a particle size below 50 microns—30 to 65 weight percent;

an inert material comprising particles having a particle size at least twice that of said material reactive with hydrogen sulfide selected from the group consisting of silica, silica gel, alumina, alumina gel, calcium sulfate (drierite), zinc silicate, and sand, wherein the particle size of said inert material is chosen to create additional voids between the components, thus increasing the porosity of the sorbent pellets—2 to 40weight percent;

a binder unreactive with hydrogen sulfide, having a particle size less than said inert material, and selected from the group consisting of bentonite, kaolinite, and cement and mixtures thereof—2 to 60 weight percent;

said mixture having been moistened with water, formed into pellets, dried, and calcined at a temperature above 538° C. (1,000° F.); and said material reactive with hydrogen sulfide being unreactive with all other components of said mixture at said calcination temperature.

* * * * *